United States Patent
Hasija et al.

(10) Patent No.: US 7,594,821 B1
(45) Date of Patent: Sep. 29, 2009

(54) SEALING GAP FORMED BY ASSEMBLED CONNECTOR PARTS

(75) Inventors: John J. Hasija, Saline, MI (US); Alexander J. Advey, Ypsilanti, MI (US); Semere T. Tesfay, Westland, MI (US); Rajesh L. Chidambarakrishnan, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 12/232,405

(22) Filed: Sep. 17, 2008

(51) Int. Cl.
*H01R 13/52* (2006.01)

(52) U.S. Cl. ...................................... 439/271

(58) Field of Classification Search ......... 439/271–276, 439/353, 357
See application file for complete search history.

(56) References Cited

U.S. PATENT DOCUMENTS

| | | | |
|---|---|---|---|
| 4,457,570 A | 7/1984 | Bogese, II | |
| 4,676,575 A * | 6/1987 | Denlinger et al. | 439/271 |
| 4,735,581 A | 4/1988 | Endo et al. | |
| 5,197,899 A * | 3/1993 | Akeda | 439/271 |
| 5,478,261 A | 12/1995 | Bogese, II | |
| 5,575,672 A | 11/1996 | Katsuma | |
| 5,725,386 A | 3/1998 | Davis et al. | |
| 5,779,489 A | 7/1998 | Davis et al. | |
| 5,911,595 A | 6/1999 | Orr, Jr. et al. | |
| 6,033,247 A | 3/2000 | Gregory, II | |
| 6,183,275 B1 | 2/2001 | Okura et al. | |
| 6,290,537 B1 * | 9/2001 | Sommer | 439/271 |
| 6,302,734 B1 * | 10/2001 | Ichio et al. | 439/587 |
| 6,386,915 B1 * | 5/2002 | Nelson | 439/584 |
| 6,443,766 B2 | 9/2002 | Ichio et al. | |
| 6,482,035 B2 | 11/2002 | Okabe et al. | |
| 6,527,579 B2 | 3/2003 | Sato et al. | |
| 6,527,586 B2 | 3/2003 | Okamura et al. | |
| 6,599,144 B1 * | 7/2003 | Schumann et al. | 439/271 |
| 6,638,090 B2 * | 10/2003 | Wakata | 439/271 |
| 6,746,258 B2 | 6/2004 | Kikuchi et al. | |
| 6,752,659 B2 | 6/2004 | Nakamura et al. | |
| 6,997,726 B2 | 2/2006 | Buden et al. | |
| 7,134,901 B2 * | 11/2006 | Okura | 439/372 |
| 7,201,609 B2 * | 4/2007 | Ishikawa | 439/587 |
| 7,214,080 B2 | 5/2007 | Ichio et al. | |
| 7,249,958 B2 | 7/2007 | Ishikawa et al. | |
| 2006/0240716 A1 | 10/2006 | Kozono et al. | |
| 2007/0020978 A1 | 1/2007 | Murakami et al. | |
| 2007/0270001 A1 | 11/2007 | Matsumura | |
| 2007/0275599 A1 | 11/2007 | Sugiyama et al. | |

* cited by examiner

*Primary Examiner*—Chandrika Prasad
(74) *Attorney, Agent, or Firm*—Daniel R. Edelbrock

(57) ABSTRACT

A sealing system for a connector assembly used to house one-piece right-angle electrical terminals. The assembly has a first part for receiving the terminals and allowing the terminals to be turned such that wire-connect portions of the terminal are seated in the first part and electrical mating portions of the terminals perpendicular to the wire-connect portions extend through a second part. The second part has an insertion section for receipt in an opening and recess of the first part and a chamber section for accommodating the mating portions of the terminals. A gap is formed by the relative sizes and shapes of the parts around the insertion section at an engagement area between the first and second parts. Latch features within the first part and on the insertion section secure the two parts together internally from the gap. A resilient gasket fits into the gap and seals the engagement area.

20 Claims, 7 Drawing Sheets

US 7,594,821 B1

SEALING GAP FORMED BY ASSEMBLED CONNECTOR PARTS

BACKGROUND OF THE INVENTION

1. Field of the Invention

The invention relates in general to an electrical connector for right-angle electrical terminals and more particularly to a sealing structure and method at an interface between separate parts of the connector.

2. Discussion of Related Art

FIG. 1 illustrates a typical prior art sealed connector assembly for a right-angle electrical terminal. The terminal includes a wire-connect segment 10 terminating the end of an electrical wire 12 and a separate mating segment 14 extending ninety degrees from the wire-connect segment. The terminal segments have to be inserted through different apertures 16 and 18 in a connector housing 20 and then joined together by a fastener 22. As a result, besides requiring two-piece terminals and an additional assembly step to join the pieces, multiple internal and external seals are required to waterproof the assembly, including a wire seal 24, a plug seal 26 for the fastener tool access aperture 18, and a connector housing gasket or seal 28.

Other types of known connectors use liquid epoxies or resins poured into electrical terminal accommodating chambers within the connector housing and then cured to seal the terminals. This sealing method can be costly and time consuming, and removal of the terminals from the connector is difficult or impossible.

It would seem beneficial to the art to provide a sealing structure that eliminated the need for extra parts such as two-piece terminals, a fastener to attach the terminal pieces together and an internal seal plug for the fastener tool access aperture. It would be advantageous as well to do away with the requirements in some right-angle connectors for epoxies or resins.

SUMMARY OF THE INVENTION

Accordingly, it is an object of this invention to provide an efficient seal system for one-piece right angle terminals in a connector assembly.

Another object of the invention is to enable easy insertion of the terminals into connector housings of the assembly and then quick, secure assembly of the housings internally of the seal system.

A further object of the invention is to minimize the number of seals needed in the assembly and to make all the seals capable of being applied externally to the connector parts.

In carrying out this invention in the illustrative embodiment thereof, the connector assembly consists of two separate housing parts. One-piece, right-angle terminals are easily rotated into a first housing part with wire-connect segments of the terminals seated in an interior of the first part and electrical mating segments of the terminals protruding from the first part. Then a second housing part receives the mating segments as the second part is partially inserted into the first housing part. Latch features internal to the assembled parts secure them together. The housing parts are structured such that when they are secured to each other, a gap is created where interfacing outside surfaces meet. A single gasket or seal fits into and spans the gap, sealing the assembly by providing resistance against water and other contaminants.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 2:
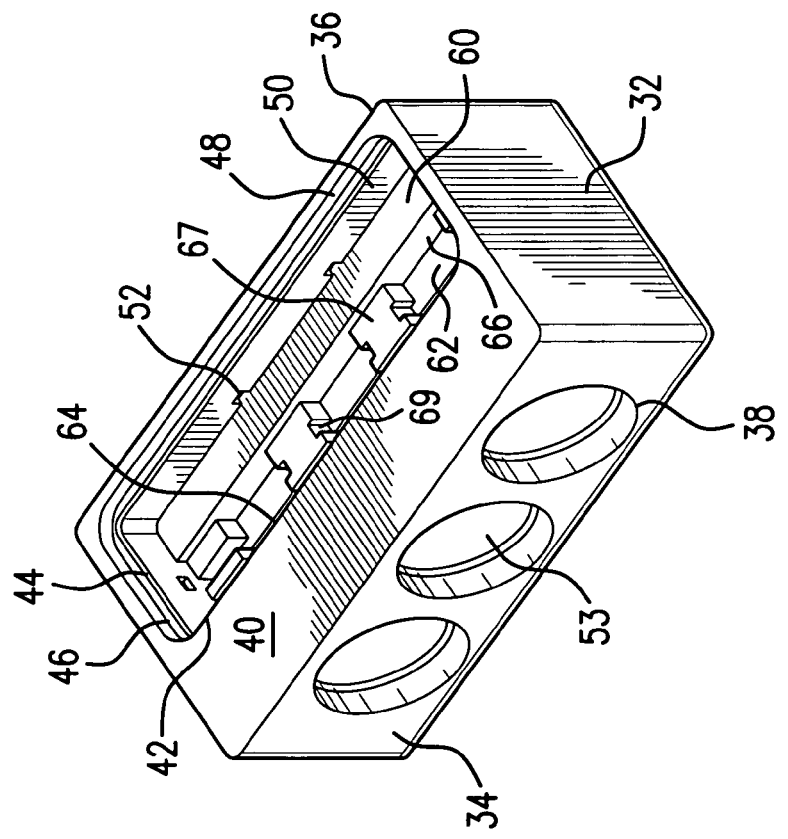
FIG. 2 is a view of a first connector part of a connector assembly according to the present invention.
Figure 4:
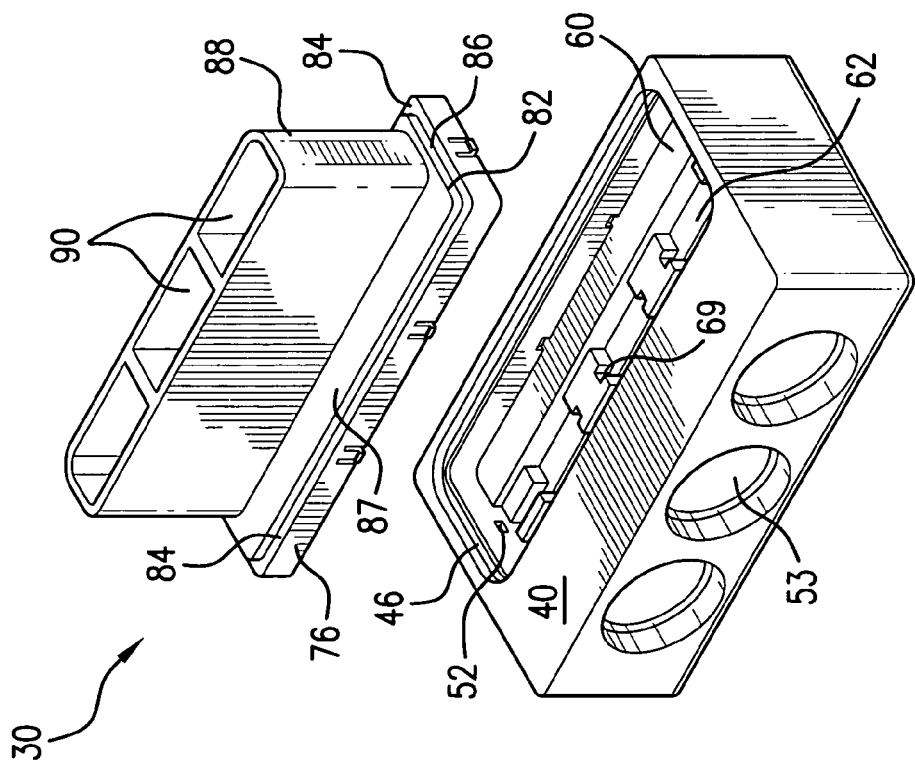
FIG. 4 is an exploded perspective view of the first connector part aligned with the second connector part of a connector assembly.

Referring now to FIGS. 2 and 4, a connector assembly 30 includes a first connector part or housing 32. The first connector part has an insertion end 34 and an opposite end 36. The insertion end 34 has circular holes 38 spaced across the insertion end for initially receiving right-angle electrical terminals. The first part 32 has an upper surface 40 in a plane perpendicular to a plane of the insertion end 34. An opening 42 extends across the surface 40 adjacent to the opposite end 36.

The opening 42 includes an inner recess 44 inset within and slightly smaller than the opening. The recess 44 forms a ridge or shoulder 46 extending around an inner perimeter 48 of the opening a short depth in from the surface 40. The recess 44 makes the width and length of the opening 42 smaller and has inner peripheral walls 50. Near lower ends of the walls 50 are spaced locking apertures 52 extending around the inner recess 44.

Figure 6:
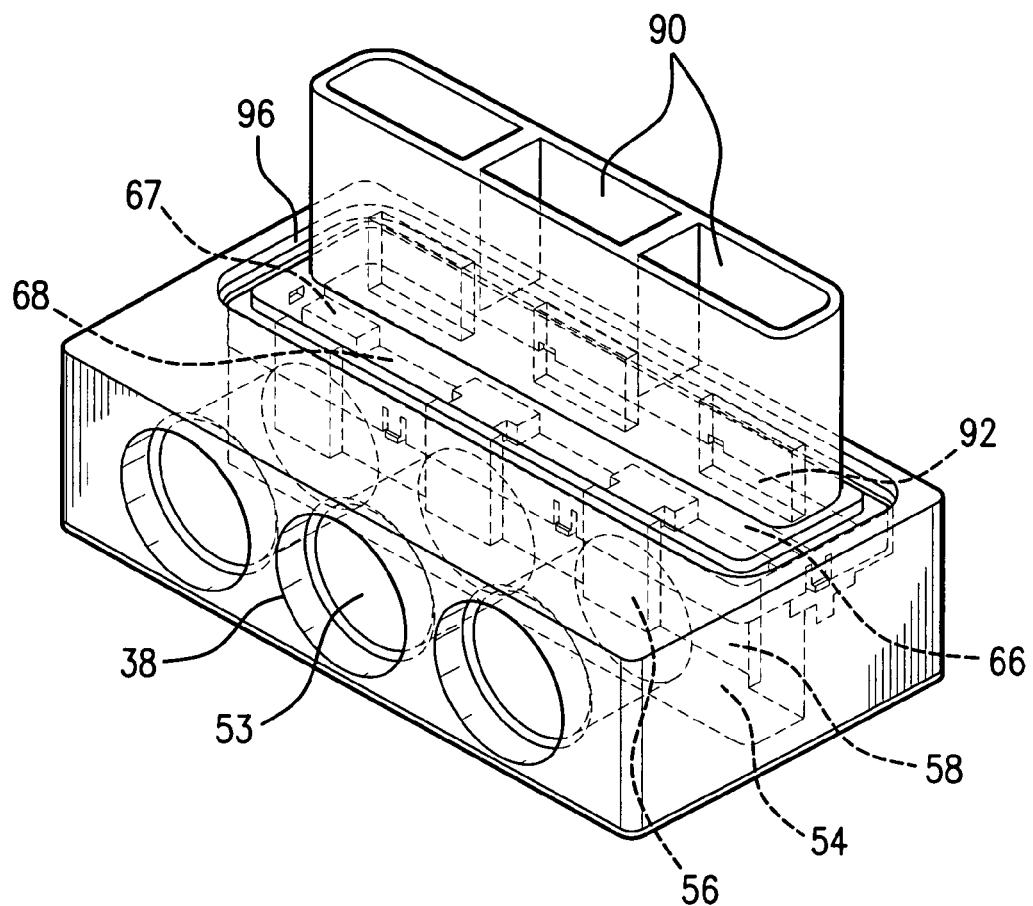
FIG. 6 illustrates internal alignment of the separate connector parts, slightly enlarged for clarity.

The circular holes 38 in the insertion end 34 of the first connector part 32 form passages 53 leading to an inner cavity 54 beneath the inner recess 44, as best shown in FIG. 6. The cavity 54 has a back wall 56 with vertical channels 58. The inner recess 44 has a partial, stepped bottom wall with a first, higher surface 60 closer to the opposite end 36 and a second, lower surface 62 closer to a center of the recess 44 and extending to a top edge 64 of the channels 58. The higher surface 60 and lower surface 62 are separated by a perpendicular riser 66. Block-like formations 67 on the lower surface 62 form guide channels 68 on the lower surface 62 perpendicular to and aligned with the vertical channels 58. The formations 67 each have notches or narrow vertical passages 69 facing the guide channels 68.

Figure 3:
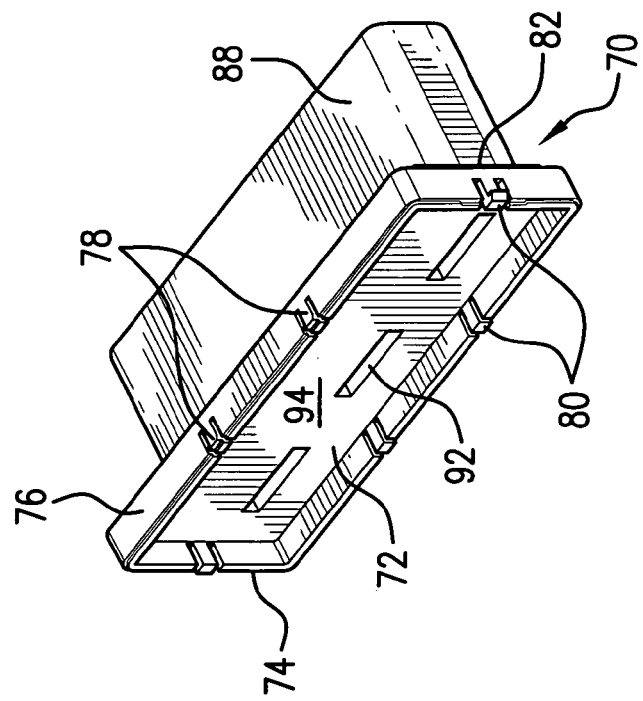
FIG. 3 is an underside view of a second connector part of the connector assembly.

As illustrated in FIGS. 3 and 4, a second connector part or housing 70 has a base section 72 with a lip or rim 74 forming an outer periphery 76. The outer periphery 76 is sized and configured to fit within the inner recess 44 of the opening 42 in the first connector part 32. The outer periphery 76 has spaced, deflectable lock arms 78 formed by vertical slits in the outer periphery, with hooks or catches 80 jutting outward from their free ends. The lock arms 78 are positioned to match the locations of the locking apertures 52 in the inner peripheral walls 50 of the recess 44 such that, after being deflected by the walls 50, the catches 80 snap into the apertures 52 and secure the first and second connector parts together. The higher surface 60 within the recess 44 prevents over-insertion of the second part 70 into the first connector part 32.

The base section 72 of the second connector part 70 is integral with a raised intermediate section 82 smaller in width and length than the base section such that a ledge 84 is formed around the raised intermediate section between the outer periphery 76 of the base section and an outer periphery 86 of the intermediate section. The base section 72 and raised intermediate section 82 together form an insertion section of the second connector part 70. The intermediate section 82 has an upper face 87. A chamber section 88 extends perpendicularly from the upper face 87. The chamber section 88 has inner terminal accommodating chambers 90 accessed from beneath through slots 92 in a recessed surface 94 of the base section 72, as best illustrated in FIG. 3.

Figure 5:
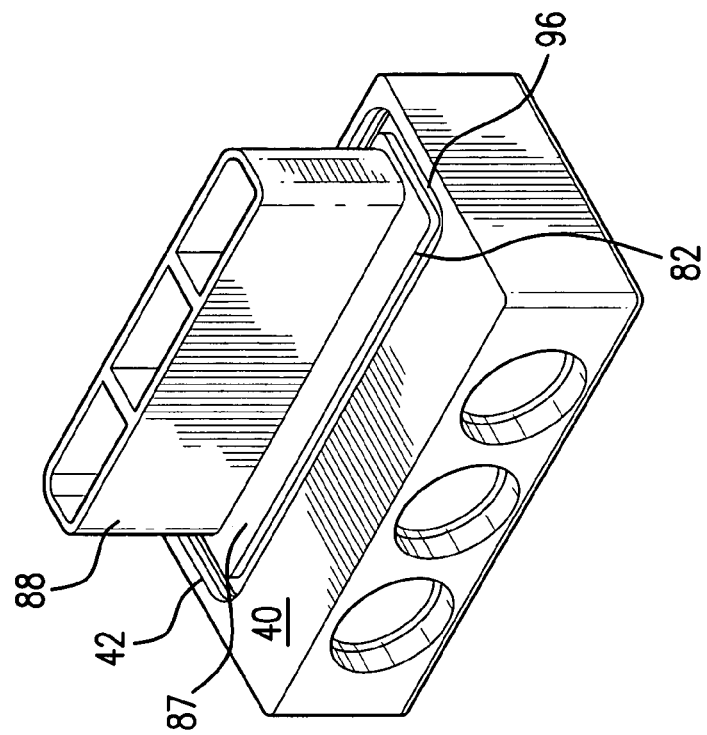
FIG. 5 is a view of the connector assembly with the separate parts joined together.

FIGS. 5 and 6 depict the assembled condition of the first and second connector parts. The height of the ledge 84 between the base section 72 and intermediate section 82 of the second part 70 is dimensioned and predetermined such that the ledge ends up at substantially the same level as the height of the shoulder 46 around the inner perimeter 48 of the opening 42 in the first connector part 32. In other words, a continuous trough or gap 96 is formed around the intermediate section 82 and chamber section 88 of the second connector part 70. The sides of the gap 96 are the inner perimeter 48 of the opening 42 and the outer periphery 86 of the intermediate section 82. The bottom of the gap 96 is formed by the abutting or joined together shoulder 46 and ledge 84, which are at the same level or in the same plane. The upper surface 40 of the first connector part 32 is generally level with or in the same plane as the upper face 87 of the intermediate section 82. The gap 96 is illustrated as being generally rectangular with rounded corners, but the opening 42 of the first connector part 32 and the insertion section of the second connector part 70 can be shaped and configured such that the gap is oval, circular or the like.

Figure 7:
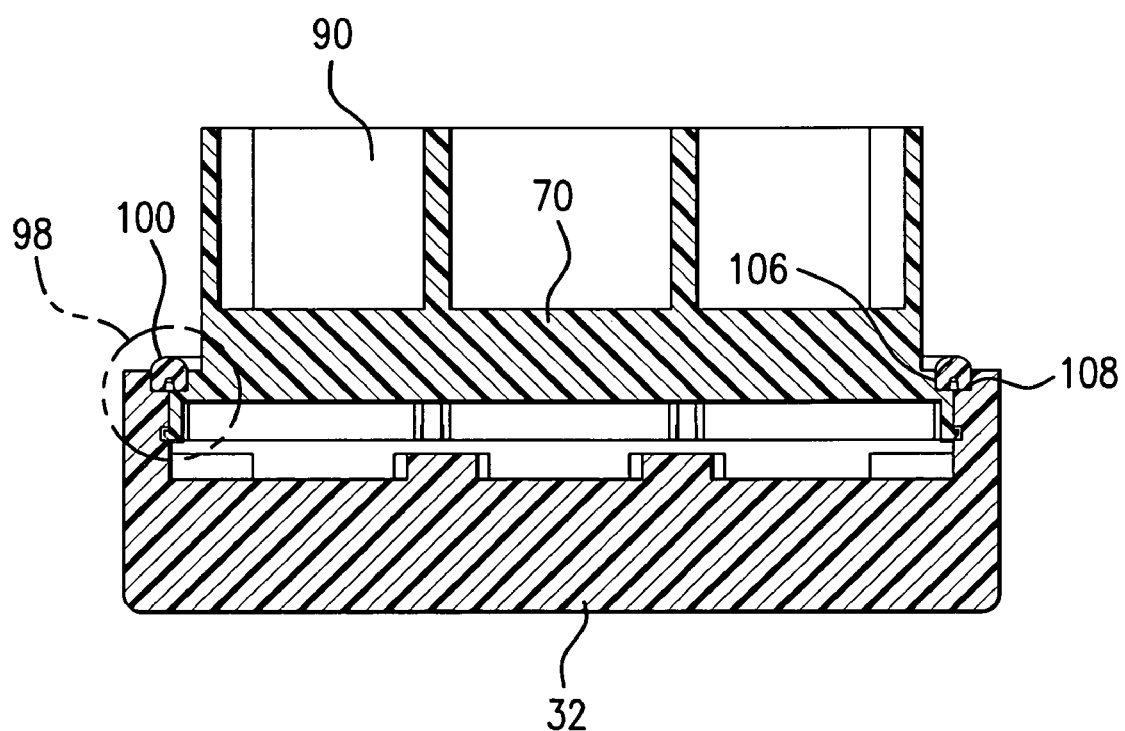
FIG. 7 is a cross-sectional front view of a gasket or seal applied in a gap created by the two connector parts.
Figure 7A:
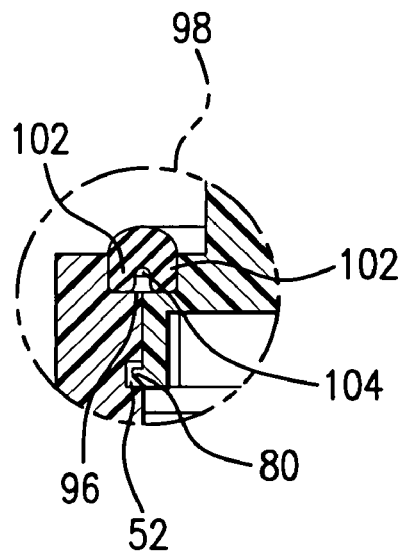
FIG. 7A is an enlarged cross-sectional view of an engagement area between the two connector parts.

Referring to FIGS. 7 and 7A, an engagement area 98 between the first connector part 32 and the second connector part 70 comprises the outer periphery 76 of the base section 72 of the second part, the inner walls 50 of the recess 44 of the first part, and the space formed by the gap 96 between the inner perimeter 48 of the opening 42 and the outer periphery 86 of the intermediate section 82. The engagement area 98 therefore includes the gap 96 and also includes the lock arms 78 and lock apertures 52 internal from the gap 96. A one-piece, resilient gasket or seal 100 selected to match the shape and size of the gap 96 is used to seal this engagement area 98. The seal may be made from rubber or some other flexible material. The seal 100 has a generally u-shaped cross-section with two outer legs 102 forming a shallow interior 104 such that the seal legs can be squeezed into the gap 96 with the shallow interior facing the bottom of the gap. The legs 102 have outer surfaces forming concentric inside and outside seal edges 106 and 108, respectively. The edges 106 and 108 press against the sides of the gap 96. Longitudinal, very shallow grooves 110, best depicted in the FIG. 8 side view, extend around the edges 106 and 108 and face the inner perimeter 48 of the opening 42 and the outer periphery 86 of the intermediate section 82. The grooves 110 create a ridge to add improved sealing properties and to enable easier insertion of the seal 100 into the gap 96.

Figure 8:
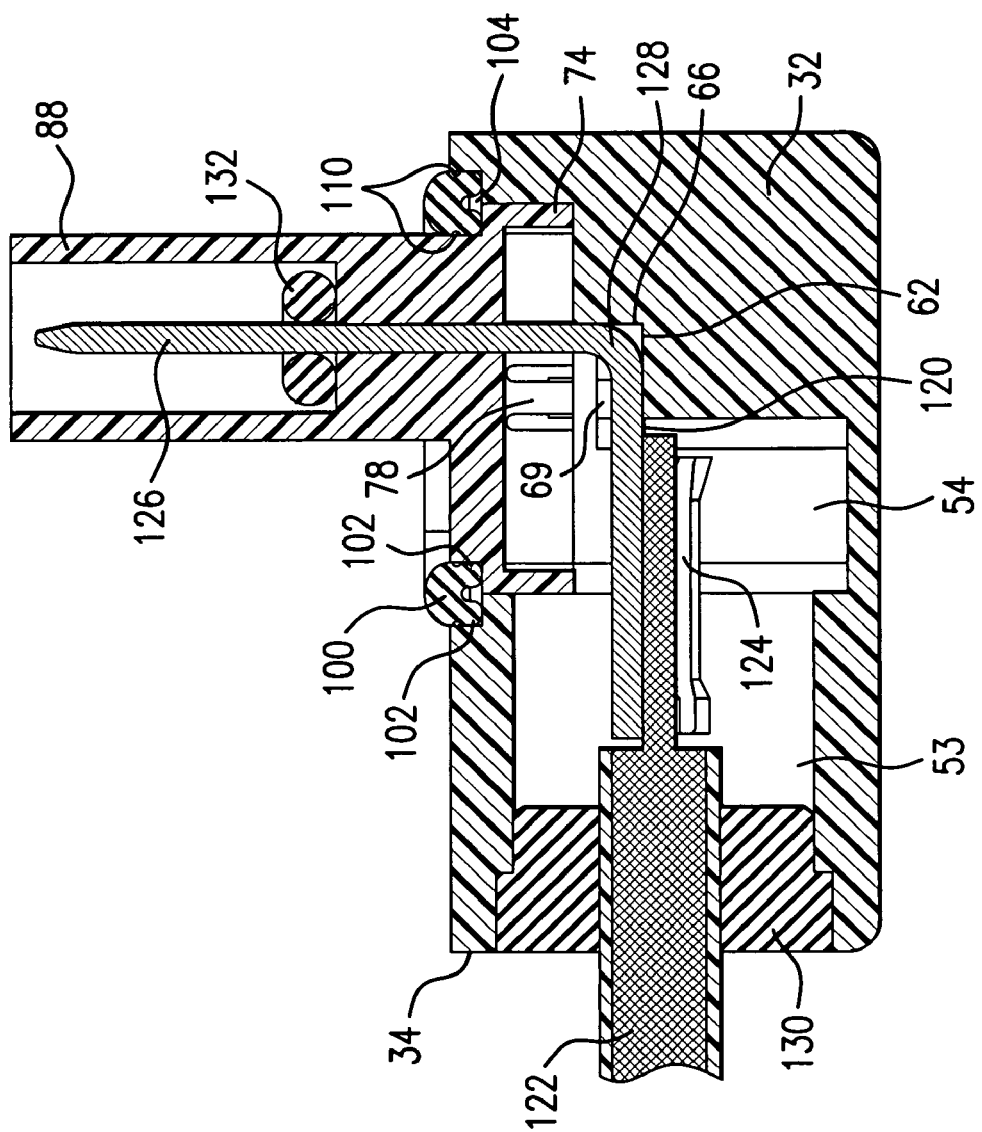
FIG. 8 is a cross-sectional side view of the assembly including an inserted right-angle terminal.

FIG. 8 illustrates the use of the connector parts with right-angle electrical terminals 120. Each terminal 120 terminates an electrical wire 122 and is electrically and mechanically attached to the wire by a wire-connect portion or segment 124 of the terminal, typically by a crimp method. An electrical mating portion or segment 126 extends at ninety degrees from the wire-connect segment 124 by way of an intermediate bend section 128. The mating segment 126 is first inserted through the hole 38 into the passage 53. As the mating segment 126 enters the inner cavity 54 the terminal is turned or rotated for insertion of the wire-connect segment 124 through the hole 38. The bend section 128 is guided over the lower surface 62 within the inner recess 44, aligned between the guide channels 68, to keep the terminals properly separated, and abutted against the riser 66. The riser 66 is used as an inner stop wall to properly position the mating segment 126 and prevent over-insertion of the terminal, limiting the insertion distance of the terminal by obstructing the wire-connect segment 124 and bend section 128 as needed. The terminal is lowered onto the surface 62 between block formations 67 into the guide channel 68. Protrusions (not shown) on each side of the wire-connect segment 124 of the terminal near the bend section 128 slide down the vertical passages 69 as the wire-connect segment seats on the lower surface 62.

When the terminals 120 are all properly inserted in the first connector part 32, the base section 72 of the second connector part 70 is guided into the opening 42 with the slots 92 aligned with the mating segments 126 of the terminals. The mating segments 126 enter the terminal accommodating chambers 90 through the slots 92 as the second connector part 70 locks into the first connector part 32. The gasket 100 is squeezed into the gap 96 to seal the connection. The gasket 100 and gap 96 eliminate the typical requirement of other types of connectors for a second gasket within or internal to the outer interface between the first and second connector parts. Resilient plugs 130 are used to seal the holes 38 around the wires 122, and o-ring seals 132 seal around the mating segments 126 of the terminals 120 in the chambers 90.

Figure 1:
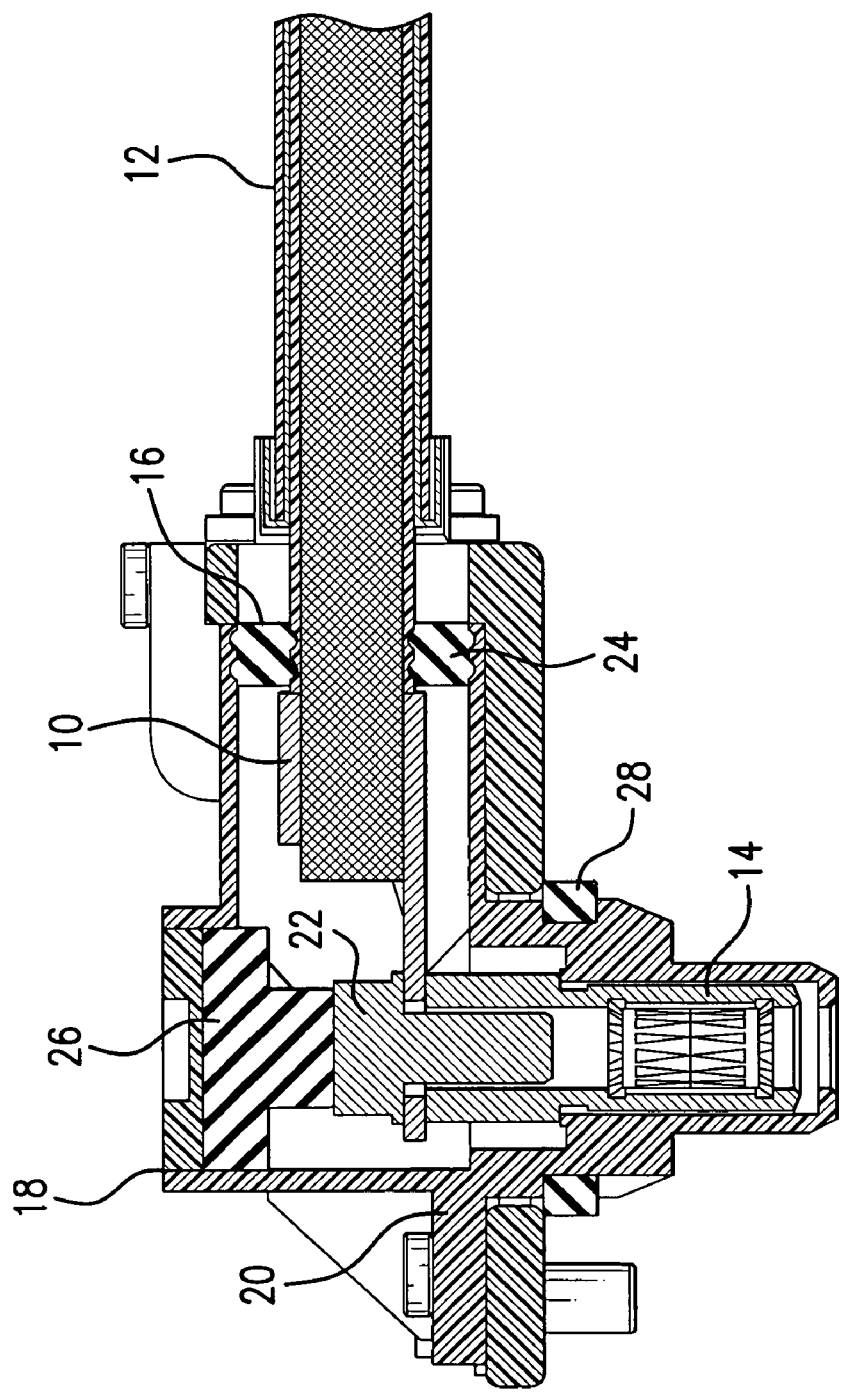
FIG. 1 is a cross-sectional side view of a prior art right-angle terminal and connector.

The first and second connector parts are molded from a suitable, electrically non-conductive plastic such as Syndiotactic Polystyrene. The terminals are typically made from a conductive material such as copper plated with tin, silver or the like. The electrical mating portions or segments 126 of the terminals are illustrated as being of the male-blade type for mating with female electrical terminals. However, female terminal mating segments, as illustrated for example in the prior art FIG. 1, could be used in the present invention by simply modifying the shape and size of the entrance slots 92 to the terminal accommodating chambers 90 in the second connector part 70.

Figure 9:
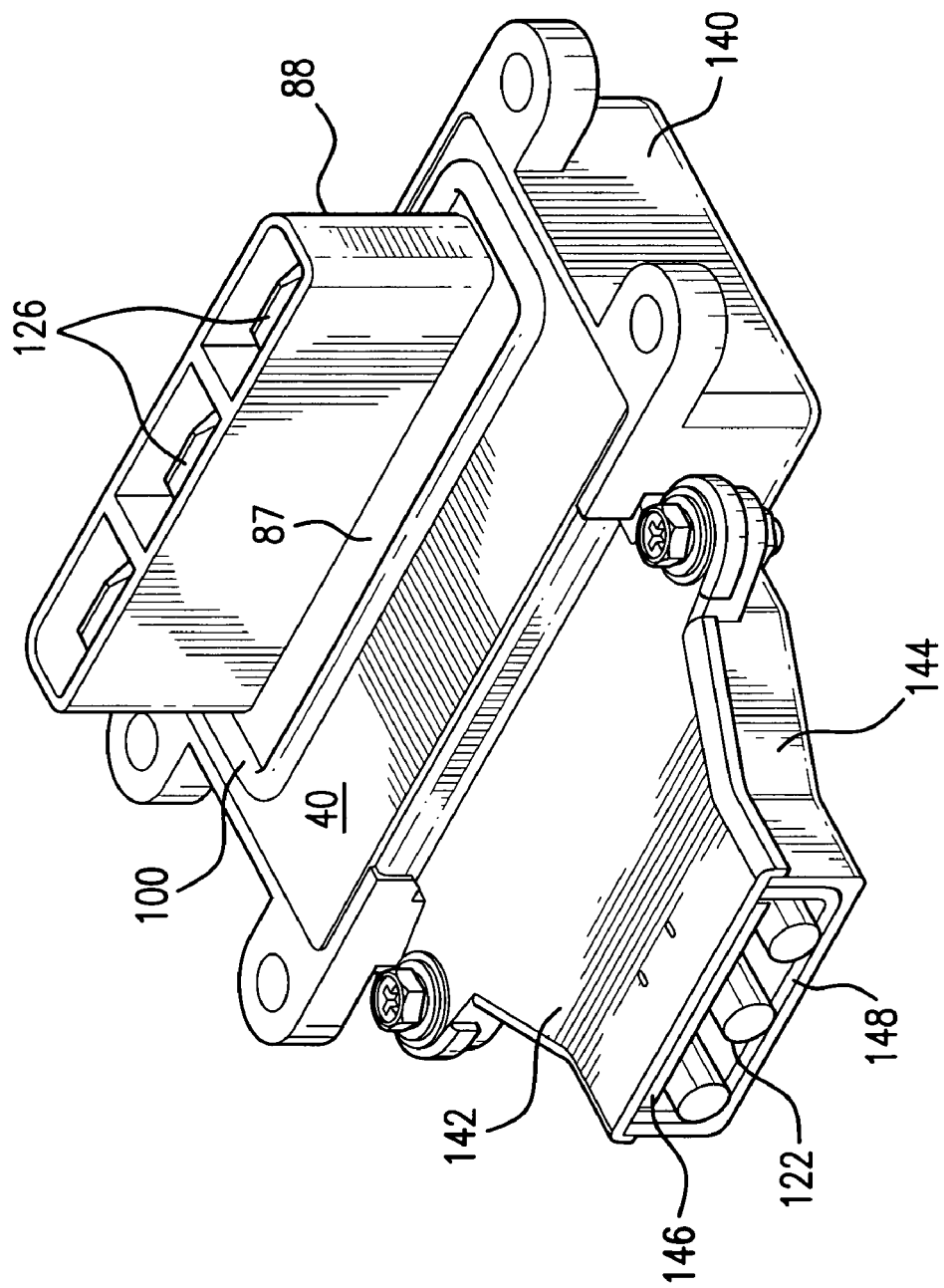
FIG. 9 is a view of a completed or full connector assembly according to the present invention.

A completed connector assembly, as illustrated in FIG. 9, includes an outer metal casing 140 that would, for example, secure the joined first and second connector parts to a vehicle transmission and shield the parts from electromagnetic interference. The mating segments 126 of the terminals 120 make electrical contact with terminals in a mating connector to complete a high-voltage electrical connection. A metal routing aid cover 142 attaches over a wire guide portion 144 of the casing 140 and secures inner rubber strain relief elements 146, 148 around the wires 122 to prevent the wires from rubbing against the casing. The gasket 100 would seal against the transmission, for example, or against a mating connector.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A connector assembly comprising:
   a first part for receiving at least one right-angle electrical terminal through an insertion end, the first part including an opening in a surface perpendicular to the insertion end through which an electrical mating portion of the at least one-right angle terminal would extend;
   a second part for receiving the mating portion of the at least one right-angle terminal, the second part having a base section, a raised intermediate section smaller in width and length than the base section such that an outer ledge is formed around the intermediate section between an outer periphery of the base section and an outer periphery of the intermediate section, the base section and intermediate section together providing an insertion section for being inserted in the opening of the first part, the second part further including a chamber section extending from the intermediate section for surrounding the mating portion of the at least one right-angle terminal, the outer ledge being positioned to cause a gap between the opening and the insertion section at an engagement area between the first and second parts when the first and second parts are assembled together; and
   a seal for fitting within the gap and sealing the engagement area between the first and second parts.

2. The connector assembly of claim 1 further comprising complementary latch features within the opening of the first part and on the insertion section of the second part for locking the first and second parts together inward from the seal.

3. A connector assembly comprising:
   a first part for receiving at least one right-angle electrical terminal through an insertion end, the first part including an opening in a surface perpendicular to the insertion end through which an electrical mating portion of the at least one-right angle terminal would extend, the opening having an inner recess inset within the opening and making a width and length of the opening smaller such that the recess forms a shoulder around an inner perimeter of the opening inward from the surface;
   a second part for receiving the mating portion of the at least one right-angle terminal, the second part having a base section sized for insertion into the recess, an intermediate section formed on the base section and being smaller in width and length than the base section such that a ledge is formed around the intermediate section between outer peripheries of the base and intermediate sections, and a chamber section extending from the intermediate section for surrounding the mating portion of the at least one right-angle terminal, such that when the base section is inserted into the recess of the first part the shoulder and ledge form a continuous gap between the surface and intermediate section.

4. The connector assembly of claim 3 further comprising a seal for fitting within the gap and sealing an engagement area between the first and second parts.

5. The connector assembly of claim 4 wherein the seal is made from a resilient material.

6. The connector assembly of claim 5 wherein the seal further includes inside and outside concentric edges, the inside edge sealing against the outer periphery of the intermediate section and the outside edge sealing against the inner perimeter of the opening.

7. The connector assembly of claim 6 wherein the inside and outside concentric edges of the seal each include a longitudinal groove facing the outer periphery of the intermediate section and the inner perimeter of the opening, respectively.

8. The connector assembly of claim 4 wherein the seal completely surrounds the outer periphery of the intermediate section of the second part.

9. The connector assembly of claim 4 wherein the seal has a u-shaped cross-section with two outer legs forming a shallow interior, the seal being placed into the gap such that the interior faces the shoulder and ledge and the legs are squeezed between the inner perimeter of the opening and the outer periphery of the intermediate section.

10. The connector assembly of claim 3 further comprising complimentary latch features on the first and second parts for locking the parts together inward from the gap.

11. The connector assembly of claim 10 wherein the complementary latch features are located within the recess of the first part and on the base section of the second part.

12. The connector assembly of claim 10 wherein the complementary latch features comprise at least one deflectable lock arm on the outer periphery of the base section corresponding in position to at least one aperture in an inner wall of the recess.

13. The connector assembly of claim 12 wherein there are multiple deflectable lock arms around the outer periphery of the base section each corresponding in positions to multiple apertures spaced along the inner wall of the recess.

14. The connector assembly of claim 3 wherein the opening of the first connector part and the intermediate section of the second connector part are shaped such that the gap around the intermediate section is rectangular with rounded corners.

15. The connector assembly of claim 3 wherein the surface of the first part and an upper face of the intermediate section of the second part are in the same plane when the parts are completely assembled together.

16. The connector assembly of claim 3 wherein a height of the shoulder and a height of the ledge are at substantially the same level when the first and second parts are completely assembled together.

17. The connector assembly of claim 3 wherein the chamber section of the second part has multiple inner chambers for receiving the mating portions of multiple terminals, the chambers being perpendicular to the insertion end of the first part when the parts are assembled together.

18. The connector assembly of claim 3 further comprising an inner stop wall within the first part to limit an insertion distance of the at least one terminal into the first part.

19. A method of sealing a connector assembly for right-angle electrical terminals, the method comprising:
providing a first part of the connector assembly with inner passages through an insertion end leading to an inner cavity beneath an opening in a surface perpendicular to a plane of the insertion end, and further providing a second part of the connector assembly with chambers perpendicular to the inner passages, the passages, cavity and chambers receiving the right-angle terminals;
having a section of the second part placed into the opening in the first part such that a gap is formed between an outer periphery of the section and an inner perimeter of the opening at an engagement area of the first and second parts; and
inserting a seal into the gap.

20. The method of claim 19 further providing complementary latch features within the first part and on the second part inward from the gap to secure the parts together.

* * * * *